US010635560B2

(12) United States Patent
Cherkalova et al.

(10) Patent No.: US 10,635,560 B2
(45) Date of Patent: Apr. 28, 2020

(54) TECHNIQUES FOR ACCURATELY APPRISING A USER OF PROGRESS IN BOOTING A VIRTUAL APPLIANCE

(71) Applicant: EMC IP Holding Company LLC, Hopkinton, MA (US)

(72) Inventors: Victoria Vladimirovna Cherkalova, Saint Petersburg (RU); Dmitry Vladimirovich Krivenok, Saint Petersburg (RU)

(73) Assignee: EMC IP Holding Company LLC, Hopkinton, MA (US)

(*) Notice: Subject to any disclaimer, the term of this patent is extended or adjusted under 35 U.S.C. 154(b) by 470 days.

(21) Appl. No.: 15/658,755

(22) Filed: Jul. 25, 2017

(65) Prior Publication Data

US 2017/0371758 A1 Dec. 28, 2017

Related U.S. Application Data

(63) Continuation of application No. PCT/RU2016/000393, filed on Jun. 27, 2016.

(51) Int. Cl.
*G06F 9/44* (2018.01)
*G06F 11/30* (2006.01)
(Continued)

(52) U.S. Cl.
CPC ........ *G06F 11/3055* (2013.01); *G06F 9/4416* (2013.01); *G06F 9/451* (2018.02);
(Continued)

(58) Field of Classification Search
CPC ............. G06F 11/3055; G06F 11/3006; G06F 11/301; G06F 11/3034; G06F 11/3048;
(Continued)

(56) References Cited

U.S. PATENT DOCUMENTS 8,296,419 B1 * 10/2012 Khanna ................. G06F 9/5072
709/201
8,370,493 B2 * 2/2013 Sirota ..................... G06F 9/485
709/226

(Continued)

FOREIGN PATENT DOCUMENTS

RU 2573789 C2 1/2016

OTHER PUBLICATIONS

International Search Report and the Written Opinion of the International Searching Authority for International Application No. PCT/RU2016/000393 mailed from the International Searching Authority dated Mar. 16, 2017, 6 pages.

*Primary Examiner* — Andre Pierre Louis
(74) *Attorney, Agent, or Firm* — BainwoodHuang

(57) ABSTRACT

A method, performed by a computing device, includes (a) building a data structure that describes dependence relationships between components of a virtual appliance, the components comprising respective computational processes which may be invoked during booting, a dependence relationship indicating that one component must complete before a second component may be invoked, (b) identifying, with reference to the data structure and an essential set of components which were pre-defined to be essential to the virtual appliance, a set of components that must complete for booting to be considered finished, and, after identifying the required set of components, repeatedly (c) querying each required component for its respective completion status, (d) calculating an estimated completion percentage for booting the virtual appliance with reference to the respective completion statuses of each required component versus all required components, and (e) displaying an indication of the completion percentage to a user via a user interface.

19 Claims, 4 Drawing Sheets

(51) Int. Cl.
*G06F 16/27* (2019.01)
*G06F 16/248* (2019.01)
*G06F 16/901* (2019.01)
*G06F 9/451* (2018.01)
*G06F 9/4401* (2018.01)
*G06F 11/32* (2006.01)
*G06F 3/14* (2006.01)
*G06F 7/523* (2006.01)
*G06F 7/535* (2006.01)
*G06F 9/455* (2018.01)

(52) U.S. Cl.
CPC ........ *G06F 11/301* (2013.01); *G06F 11/3006* (2013.01); *G06F 11/3034* (2013.01); *G06F 11/3048* (2013.01); *G06F 11/328* (2013.01); *G06F 16/248* (2019.01); *G06F 16/27* (2019.01); *G06F 16/9024* (2019.01); *G06F 3/14* (2013.01); *G06F 7/523* (2013.01); *G06F 7/535* (2013.01); *G06F 9/4401* (2013.01); *G06F 9/45558* (2013.01); *G06F 2009/45575* (2013.01)

(58) Field of Classification Search
CPC ........ G06F 11/328; G06F 9/451; G06F 16/27; G06F 16/248; G06F 16/9024
USPC .......................................................... 703/21
See application file for complete search history.

(56) References Cited

U.S. PATENT DOCUMENTS

| | | |
|---|---|---|
| 9,182,974 B1 | 11/2015 | Voronkov et al. |
| 9,286,099 B2 | 3/2016 | Cai |
| 2013/0054950 A1* | 2/2013 | Tsirkin ................. G06F 9/4408 713/2 |

* cited by examiner

TECHNIQUES FOR ACCURATELY APPRISING A USER OF PROGRESS IN BOOTING A VIRTUAL APPLIANCE

BACKGROUND

Data storage systems (DSSes) store large quantities of data logically arranged onto many logical disks accessible to host devices. Host devices send data storage commands to a DSS in order for the DSS to access its storage and fulfill the data storage commands with respect to a logical disk. Some DSSes may be arranged as a pair or collection of storage processor devices configured to process data storage commands in a redundant or fault-tolerant manner.

Instead of using a physical DSS having physical storage processors, it is sometimes beneficial to run a virtual storage appliance (VSA) made up of virtualized storage processors within virtual machines (VMs). One or more enterprise servers may run several VMs in parallel, allowing flexibility in where each virtualized storage processor runs and allowing the virtualized storage processors to be instantiated on various servers as resource availability dictates. This approach also allows the storage for the VSA to be distributed across a network, so long as the storage can be made available to the VMs, such as through a hypervisor running a virtualized storage module on one of the servers. Typically, a user wishing to run a VSA downloads an installation package from a software provider, and then installs and configures the package for use on the user's servers.

SUMMARY

Unfortunately, the above-described approaches may suffer from deficiencies. For example, even once the VSA is installed and configured, it can often take a considerable amount of time (e.g., an hour) for the virtual storage appliance to boot, particularly the first time. However, until the VSA fully boots and becomes available for use, the user may not know whether the VSA is still booting or whether it has crashed. It is possible to configure the VSA to report to the user on its progress as it boots, but it is difficult to do this effectively.

One way of doing this is to program the VSA with an estimate of the total time that a boot is expected to take, and then report progress based on the expected amount of time. However, this approach may be defective because the expected amount of time is quite variable depending on the exact configuration, which can further vary as the VSA is upgraded. It is also defective because it may still report progress even if the VSA has crashed.

Another way to configure the VSA to report to the user on its progress as it boots is to program a list of components of the VSA into a boot progress module so that it can query each of those components for completion, allowing the boot progress module to estimate actual progress during booting. However, since the configuration of a VSA can vary considerably from system to system based on system hardware and feature licensing (and even within a particular system as features are added during upgrades), it is not possible to pre-program a list of all the components necessary for a particular installation to boot up, making this kind of technique very inexact.

Thus, it would be desirable to keep a user apprised of actual boot progress in an accurate manner. This may be accomplished by defining a list of essential components of the VSA necessary for a complete boot and determining, at boot time, what other components are also needed based on dependence relationships between the components. It is then possible to query all such needed components and to estimate a percent completion. This percent completion can be displayed to the user as the boot progresses, or it may be combined with an expected boot time to estimate time remaining.

In one embodiment, a computer-implemented method of displaying an estimate of progress in booting a virtual appliance on a set of virtual machines is performed. The method includes (a) building, by a computing device, a data structure that describes dependence relationships between components of the virtual appliance, the components comprising respective computational processes which may be invoked during booting, a dependence relationship indicating that a first component must complete before a second component may be invoked, (b) identifying, by the computing device, with reference to the data structure and an indication of an essential set of components which were pre-defined to be essential to the virtual appliance, a set of components that must complete for booting to be considered finished, and, after identifying the set of components required for booting, repeatedly, by the computing device, (c) querying each required component of the set of components that must complete for its respective completion status, (d) calculating an estimated completion percentage for booting the virtual appliance with reference to the respective completion statuses of each required component versus all required components, and (e) displaying an indication of the completion percentage to a user via a user interface. An apparatus, system, and computer program product for performing a similar method are also provided.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views.

DETAILED DESCRIPTION

Embodiments are directed to techniques for keeping a user apprised of actual boot progress in an accurate manner. This may be accomplished by defining a list of essential components of a virtual storage appliance (VSA) necessary for a complete boot and determining, at boot time, what other components are also needed based on dependence relationships between the components. It is then possible to query all such needed components and to estimate a percent completion. This percent completion can be displayed to the user as the boot progresses, or it may be combined with an expected boot time to estimate time remaining.

Figure 1:
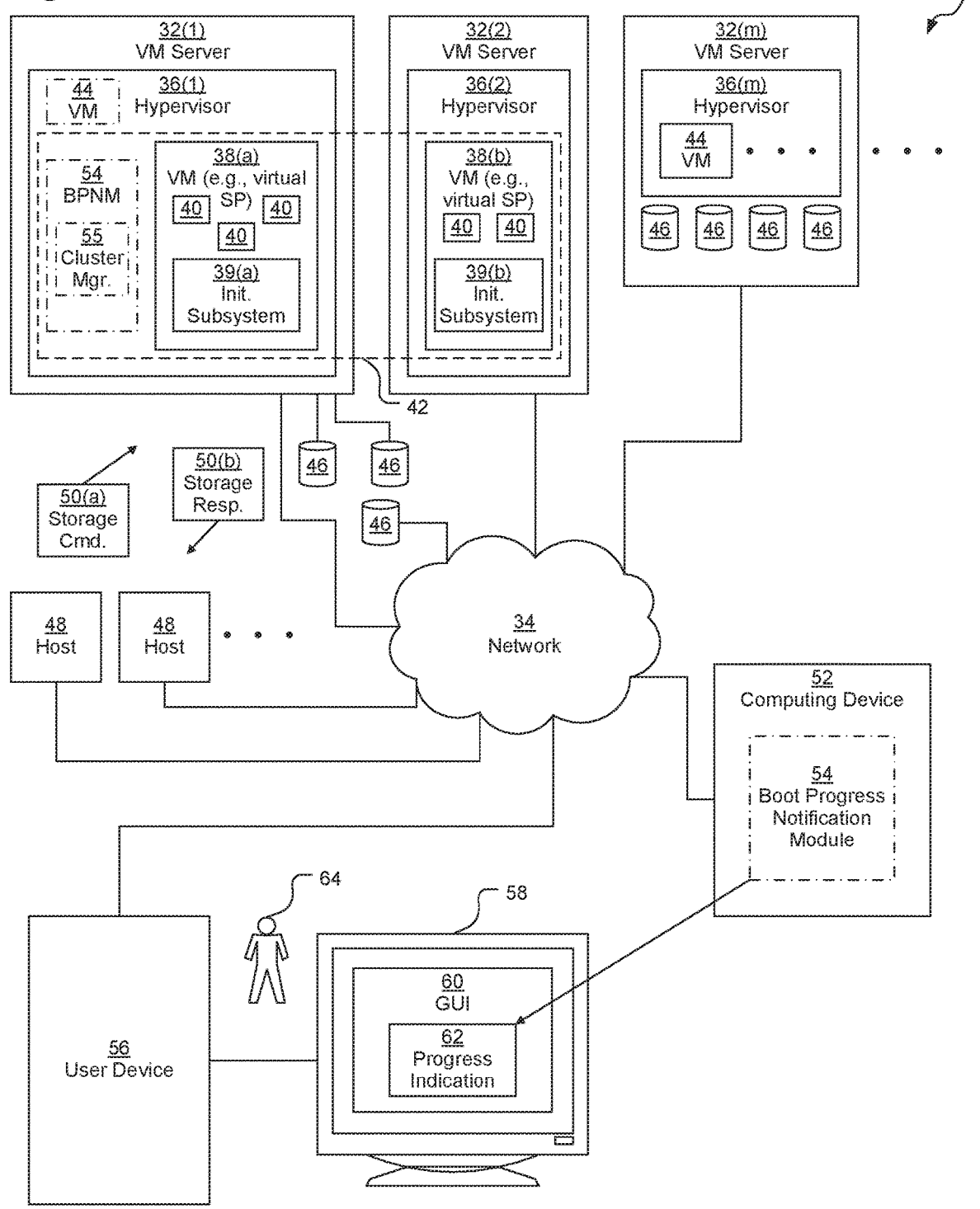
FIG. 1 is a block diagram depicting an example system for use in connection with various embodiments.

FIG. 1 depicts a system 30. System 30 includes a set of virtual machine (VM) servers 32 (depicted as VM servers 32(1), 32(2), . . . , 32(*m*)) connected to a network 34. VM servers 32 are configured to each run a hypervisor 36 (depicted as hypervisors 36(1), 36(2), . . . , 36(*m*)). Each hypervisor 36 is configured to allow various VMs 38, 44 to execute on its respective VM server 32, as is well-known in the art. As depicted, VMs 38 (depicted as VMs 38(a), 38(b)) are each elements of a virtualized appliance 42. Virtualized appliance 42 may include one or more VMs 38, although, in a typical embodiment, virtualized appliance 42 includes two VMs 38. Although virtualized appliance 42 may have various configurations, in a typical embodiment, it is a virtualized storage appliance with its constituent VMs 38 being virtual storage processors configured to process storage commands 50(a) from hosts on the network 34 directed at logical disks backed by storage devices 46 (which may be internal to a VM server 32, e.g., VM server 32(m); attached externally to a VM server 32, e.g., VM server 32(1); or attached directly to the network 34, e.g., network-attached storage) and to return storage responses 50(b) (e.g., with data read from the logical disks or with confirmation of writes being performed).

Each VM 38 runs one or more components 40. A component 40 may include a process or a clustered component. Processes are invoked by an initialization subsystem 39 (depicted as initialization subsystems 39(a), 39(b)), running as part of each VM 38. In some embodiments, initialization subsystem 38 may utilize a script that lists the various processes to be invoked as well as information about when each process is to be invoked in relation to other processes or clustered components (e.g., "run process 7 after process 5 completes" or "run process 9 after clustered component 3 and processes 2 and 4 complete"). Cluster manager 55 similarly invokes clustered components according to a dependency schedule. A clustered component is a component managed by cluster manager 55 that can start either on one VM 38 of the cluster (e.g., virtualized appliance 42) or on several VMs 38 depending on user configuration. Cluster manager 55 runs within virtualized appliance 42, either within one of its constituent VMs 38, independently, or within another process of the virtualized appliance 42.

Boot progress notification module (BPNM) 54 may run on either a separate computing device 52 attached to the network, or it may run as part of the virtualized appliance 42 or just in conjunction with one of the hypervisors 36 (not depicted). BPNM 54 operates to keep track of the progress of the boot of the virtualized appliance 42 and to report that progress to a user 64. As depicted, BPNM 54 sends a progress indication 62 to a remote user device 56 on the network 34 for the user device 56 to display to user 64 within a graphical user interface (GUI) 60 on a display device 58. In other embodiments however, the display device 58 may instead be connected directly to the same device 32, 52 that BPNM 54 runs on, obviating any need to send the progress indication 62 across network 34. Display device 58 may be, for example, a CRT, LCD, plasma, or LED monitor or embedded display screen.

VM servers 32 may be any kind of computing devices configured to operate on a network and host VMs 38, 44 on a hypervisor 36, such as, for example, personal computers, workstations, server computers, enterprise servers, laptop computers, tablet computers, smart phones, mobile computers, etc. or combinations thereof. Typically, a VM server 32 is a server computer or an enterprise server.

A host 48 may be any kind of computing device configured to operate on a network, such as, for example, personal computers, workstations, server computers, enterprise servers, laptop computers, tablet computers, smart phones, mobile computers, etc. or combinations thereof. Typically, a host 48 is a server computer or an enterprise server. Hosts 48 issue data storage commands 50(a) and receive data storage responses 50(b) from DSSes or virtualized storage appliances (e.g., virtualized appliance 42) in order to read from and write to storage.

Network 34 may be any kind of communication network, such as a storage area network (SAN), local area network (LAN), wide area network (WAN), cellular data network, wireless network, interconnected fabric of point-to-point connections, etc.

Figure 2:
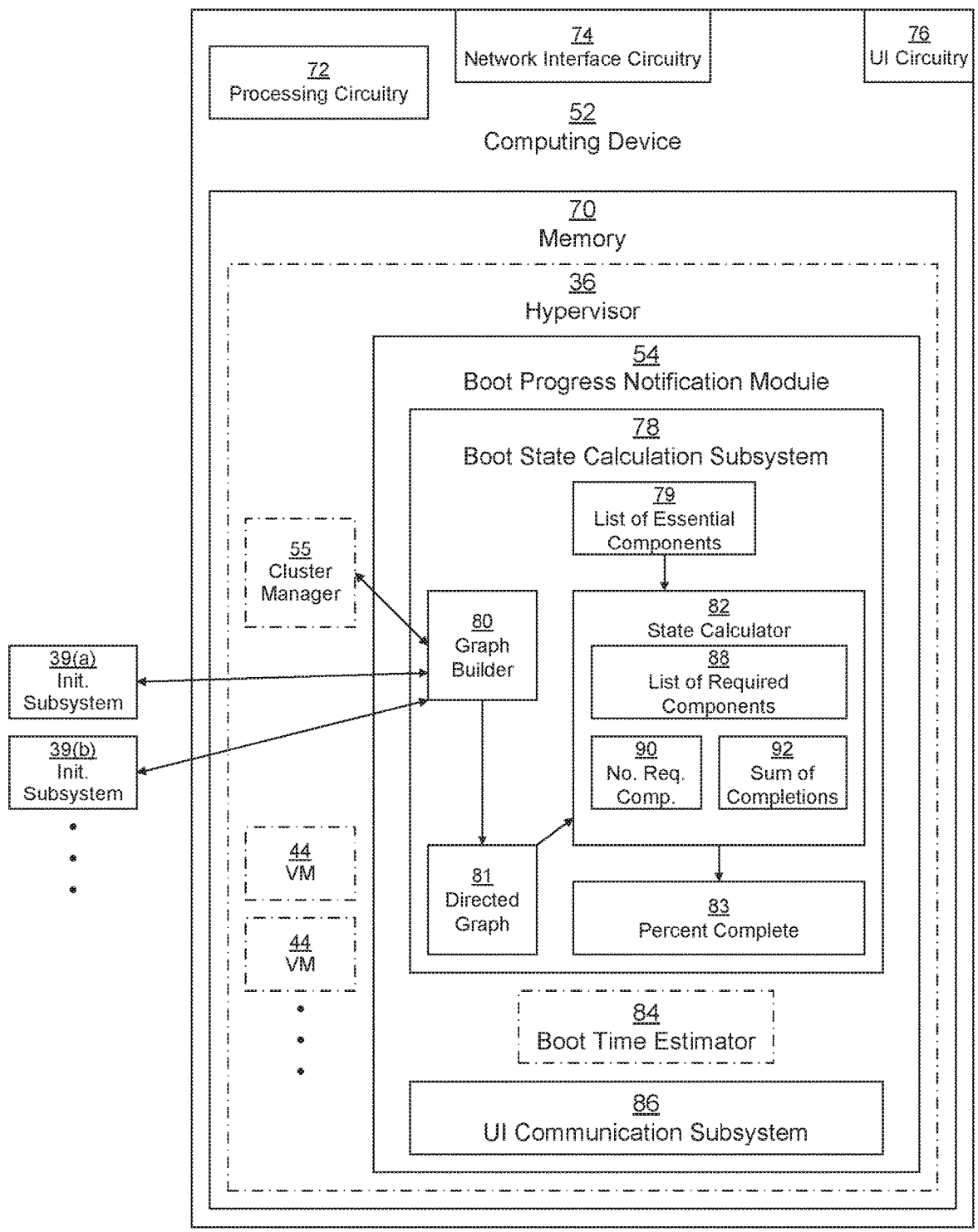
FIG. 2 is a block diagram depicting an example apparatus for use in connection with various embodiments.

FIG. 2 depicts an example computing device 52 in further detail. It should be understood that, in some embodiments, the computing device 52 may be one of the VM servers 32 rather than a standalone machine.

Computing device 52 includes memory 70, processing circuitry 72, and network interface circuitry 74. In some embodiments, it may also include persistent storage, user interface circuitry, and various other components as is well-known in the art.

Processing circuitry 72 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Network interface circuitry 74 may include one or more Ethernet cards, cellular modems, Fibre Channel (FC) adapters, Wireless Fidelity (Wi-Fi) wireless networking adapters, and other devices for connecting to a network, such as network 34. Network interface circuitry 74 is able to communicate with VM servers 32 and user device 56.

Memory 70 may be any kind of digital system memory, such as, for example, random access memory (RAM). Memory 70 stores one or more operating systems in operation (not depicted, e.g., Linux, UNIX, Windows, MacOS, or a similar operating system), various applications executing on processing circuitry 72 (e.g., BPNM 54 and its component modules 78, 80, 82, 84, 86; hypervisor 36; virtual machines 44; etc.) as well as data used by those applications.

BPNM 54 includes several sub-modules, including a boot state calculation subsystem 78 and a user interface (UI) communication subsystem 86. In some embodiments, BPNM 54 also includes a boot time estimator 84.

Boot state calculation subsystem 78 includes a graph builder module 80 and a state calculator module 82. Graph builder module 80 communicates with cluster manager 55 and the initialization subsystem 39 of each VM 38 within the virtualized appliance 42 in order to build a directed graph 81. Directed graph 81 is a data structure that indicates all components 40 (processes and clustered components) of the virtualized appliance 42 with information about dependencies between the various components 40 (e.g., which components 40 are required to complete before other components 40 may begin). An example 100 directed graph 81 is depicted in further detail in FIG. 3, below. Boot state calculation subsystem 78 typically runs once per boot of the virtualized appliance 42, allowing the directed graph 81 to be updated in case different components 40 and their dependencies change due to installation, upgrade, or licensing changes.

Boot state calculation subsystem 78 also stores a list 79 of essential components 40. List 79 indicates which components 40 of the virtualized appliance 42 are deemed to be essential in order for the virtualized appliance 42 to be considered to be fully booted. That is, all components 40 on the list 79 must complete before the virtualized appliance 42 can be considered to be fully booted. In some embodiments, a programmer creates the list 79 at the time that an installation module for the virtualized appliance 42 is created (e.g., before it is downloaded and installed within system 30). In other embodiments, the user 64 (e.g., a system administrator for system 30) selects which components 40 are deemed to be essential at the time the virtualized appliance 42 is installed, thereby creating the list 79 at installation time.

State calculator module 82 runs as the boot of the virtualized appliance 42 progresses. Upon the boot process beginning, state calculator module 82 takes list 79 and the directed graph 81 as inputs, and uses those two inputs to calculate the list 88 of required components 40. List 88 includes all essential components 40 from list 79 as well as all other components 40 that must complete before the essential components 40 from the list 79 can start. Once list 88 has been created, state calculator 82 may store the number 90 of required components 40 from the list 88. As the boot progresses, boot state calculation subsystem 78 queries each component 40 on the required list 88 as to each completion status. Based on responses received, state calculator 82 is able to calculate a completion sum 92, which represents how many of the required components 40 from the required list 88 have completed (in some embodiments, partial completions may be included in this sum as fractions). State calculator 82 is then able to calculate and update a completion percentage 83 stored in memory 70.

In some embodiments, UI communication subsystem 86 sends the completion percentage 83 to the user device 56 as the progress indication 62 to be displayed to the user 64. In other embodiments, boot time estimator uses the completion percentage 83 together with stored information (not depicted) about how long the boot process is expected to take in order to calculate an estimate of time remaining in the boot process. In these embodiments, UI communication subsystem 86 sends the calculated estimate of time remaining to the user device 56 as the progress indication 62 to be displayed to the user 64. In other embodiments, the progress indication 62 includes both the completion percentage 83 as well as the calculated estimate of time remaining.

In some embodiments, memory 70 may also include a persistent storage portion (not depicted). Persistent storage portion of memory 70 may be made up of one or more persistent storage devices, such as, for example, hard disk drives, solid-state storage devices, flash drives, etc. Persistent storage of memory 70 is configured to store programs and data even while the computing device 52 is powered off. The OS (e.g., Linux, UNIX, Windows, or a similar operating system) and the applications (e.g., modules 76, 78, 80, 82, 84, 86) are typically stored in persistent storage so that they may be loaded into a system portion of memory 70 from persistent storage upon a system restart. These applications, when stored in non-transient form either in the volatile portion of memory 70 or in persistent storage, form a computer program product. The processing circuitry 72 running one or more of these applications thus forms a specialized circuit constructed and arranged to carry out the various processes described herein.

Figure 3:
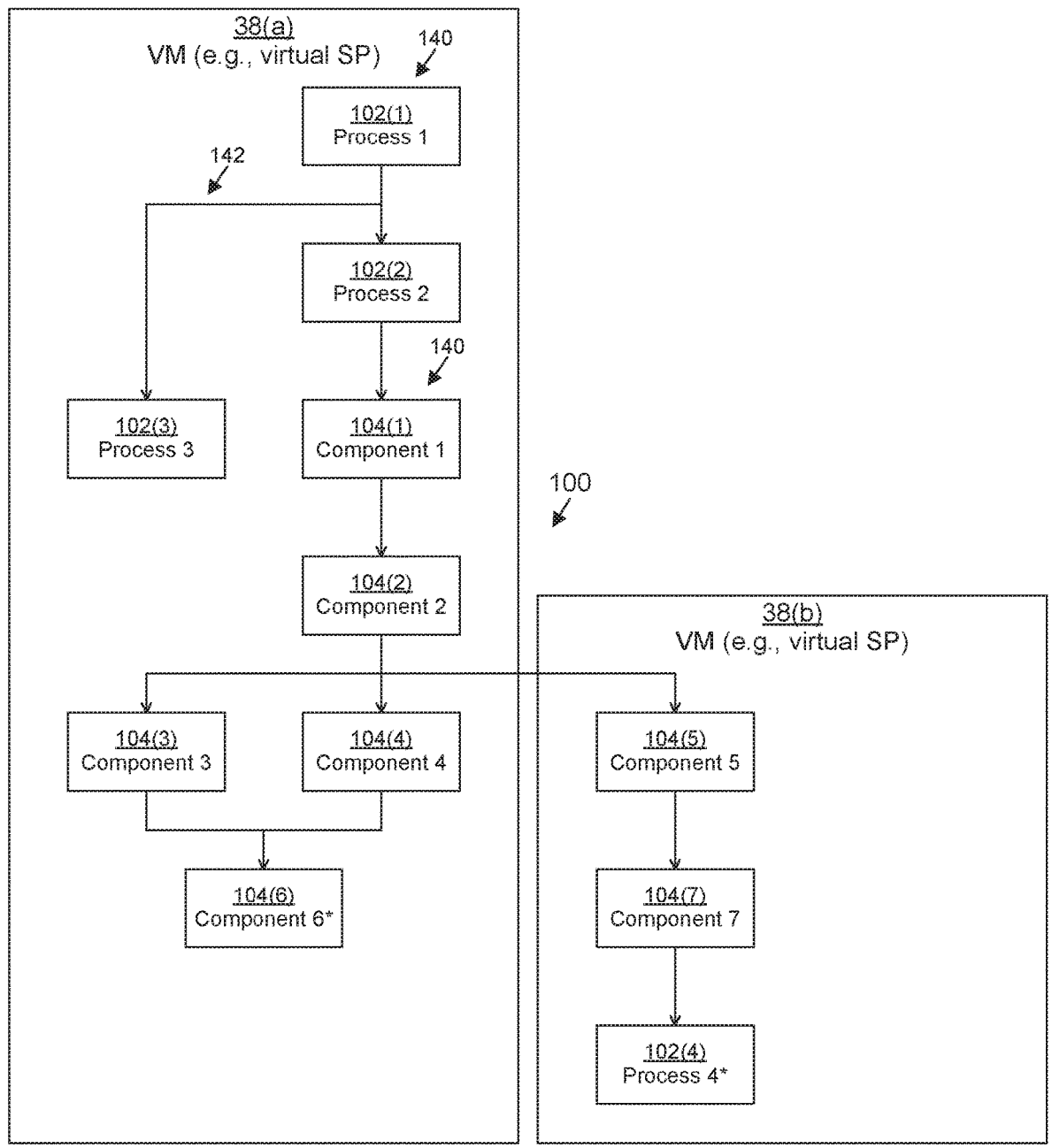
FIG. 3 is a block diagram depicting an example data structure for use in connection with various embodiments.

FIG. 3 illustrates an example 100 directed graph 81. A directed graph is a collection of nodes 140 with directed edges 142 connecting the nodes 140 in a directional way (indicated by the arrow heads). In the example directed graph 100, each node 140 represents a component 40, either a process 102 or a clustered component 104. As depicted, VM 38(a) includes three processes 102(1), 102(2), 102(3), while VM 38(b) includes one process 102(4). In addition VM 38(a) includes five clustered components 104(1), 104(2), 104(3), 104(4), 104(6), while VM 38(b) includes two clustered components 104(5), 104(7). Although any clustered component 104 may run on either VM 38, typically once it completes on one of the VMs 38, that clustered component 104 is considered to be complete. As depicted, process 3 102(3) and process 2 102(2) are both dependent on process 1 102(1) completing, while component 1 104(1) is dependent on process 2 102(2) completing. Components 3, 4, and 5 104(3), 104(4), 104(5) are all dependent on component 2 completing. Other dependencies are also depicted by the directed edges 142 as shown.

Starred nodes 140 (i.e., those depicted with an asterisk) are those marked on the list 79 of essential components 40. Thus, component 6 104(6) and process 4 102(4) are deemed essential. State calculator 82 is then able to traverse the example directed graph 100 starting at each of these essential components 40 tracing the directed edges 142 backwards to yield the required list 88. Both essential components 104(6), 102(4) are deemed required. Since 104(6) is essential and it depends on 104(3) and 104(4), those components are also deemed required. Since 102(4) is essential and it depends on 104(7), that component is also deemed required. Since 104(7) is required and it depends on 104(5), that component is also deemed required.

Since 104(3), 104(4), and 104(5) are all required and they all depend on 104(2), that component is also deemed required. Since 104(2) is required and it depends on 104(1), that component is also deemed required. Since 104(5) is required and it depends on 102(2), that component is also deemed required. Since 102(2) is required and it depends on 102(1), that component is also deemed required.

However, no component 40 depends on process 3 102(3), so process 3 102(2) is not deemed to be required.

Thus, example directed graph 100 yields a required list 88 including the following:
Process 1 102(1)
Process 2 102(2)
Clustered component 1 104(1)
Clustered component 2 104(2)
Clustered component 3 104(3)
Clustered component 4 104(4)
Clustered component 5 104(5)
Clustered component 6 104(6)
Clustered component 7 104(7)
Process 4 102(4).

Figure 4:
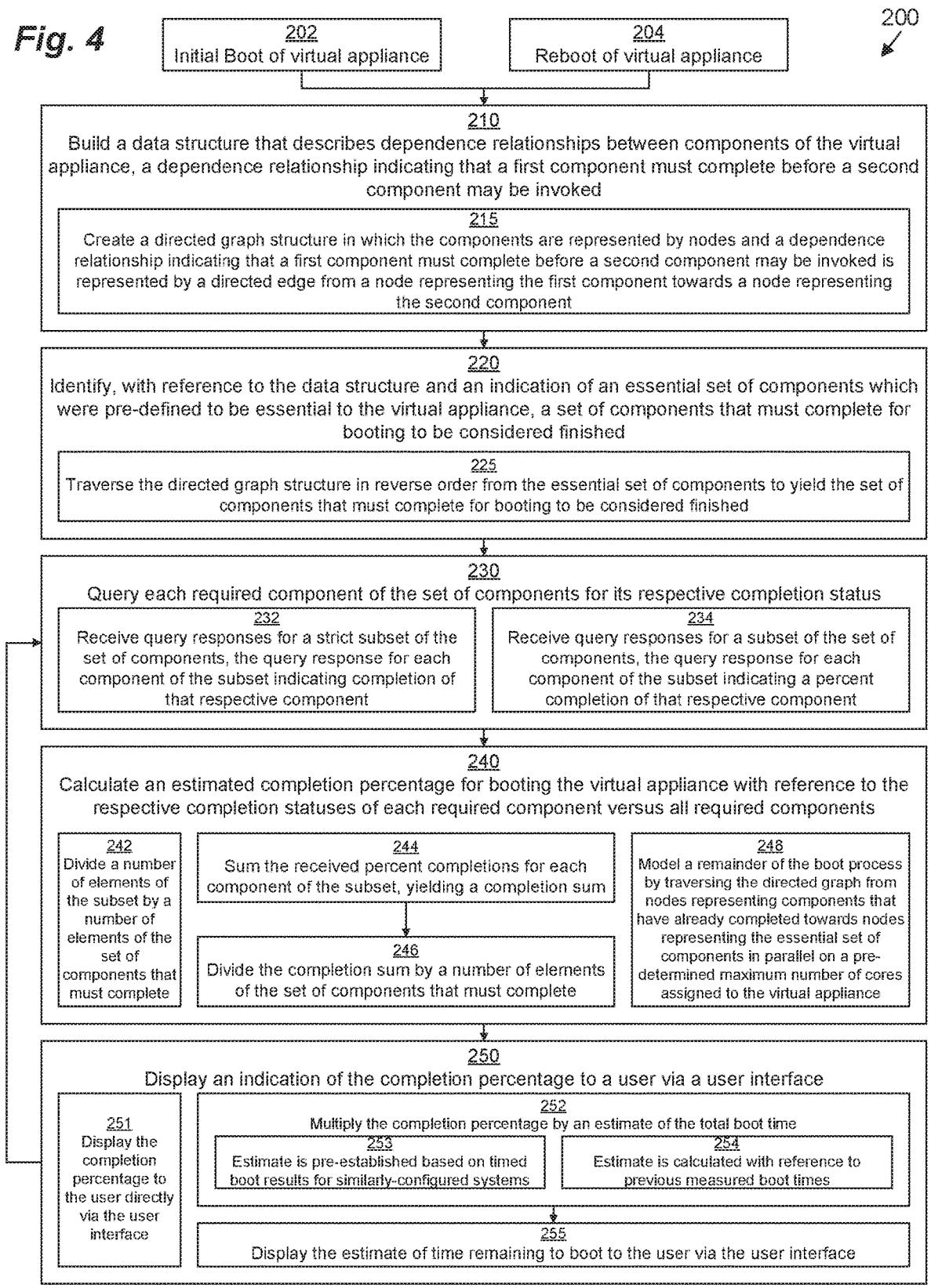
FIG. 4 is a flowchart depicting example methods for use in connection with various embodiments.

FIG. 4 illustrates an example method 200 performed by BPNM 54. It should be understood that any time a piece of software (e.g., BPNM 54; any of its component modules 78, 80, 82, 84, 86; hypervisor 36; virtual machines 38, 44; etc.) is described as performing a method, process, step, or function, in actuality what is meant is that a computing device (e.g., computing device 52) on which that piece of software is running performs the method, process, step, or function when executing that piece of software on its processing circuitry 72.

It should be understood that, within FIG. 4, various steps and sub-steps may be omitted. Similarly, in some embodiments, one or more steps or sub-steps may be combined together or performed in a different order. Method 200 is performed by BPNM 54, more specifically by processing circuitry 72 of computing device 52 in conjunction with various other system components (although, in some embodiments, computing device 52 may also serve as one of the VM servers 32 and/or the user device 56).

Preliminarily, step 202 indicates that method 200 may be performed in response to an initial boot (i.e., the first boot after the virtual appliance 42 is configured) of the virtual appliance 42. Typically, the first time the virtual appliance 42 boots up, it needs to perform a lot of initialization procedures (e.g., zeroing disk space, etc.), causing the initial boot process to take a long time (depending on the configuration, 20 to 60 minutes, although it may be even shorter or longer).

Step 204 indicates that method 200 may also be performed in response to a reboot of the virtual appliance 42. In some embodiments, a reboot (even after an upgrade) is much faster than an initial boot because many fewer initializations are required. Thus, for example, a reboot may take only 5 minutes compared to 30 minutes for an initial boot on the same system 30. Although method 200 is most helpful when dealing with long boots, it can still be useful on reboots because even 5 minutes is a long time in the minds of many users 64.

In step 210, graph builder 80 builds a data structure (e.g., directed graph 81) that describes dependence relationships between components 40 of the virtual appliance 42, the components 40 comprising respective computational processes 102 which may be invoked during booting, a dependence relationship indicating that a first component 40 must complete before a second component 40 may be invoked. In some embodiments, this step involves querying the initialization subsystem 39 for each VM 38 of the virtual appliance 42 (e.g., by reading an init script) and extracting the processes 102 and dependencies from there. In some embodiments, the components 40 may also include clustered components 104. In some of these embodiments, this step also involves querying the cluster manager 55 of the virtual appliance 42 and extracting the clustered components 104 and dependencies from there.

Although various types of data structures may be used, in one embodiment (sub-step 215), step 210 is accomplished by creating a directed graph structure 81 (e.g., similar to example directed graph 100) in which the components 40 are represented by nodes 140 and a dependence relationship indicating that a first component 40 must complete before a second component 40 may be invoked is represented by a directed edge 142 from a node 140 representing the first component 40 towards a node 140 representing the second component 40.

In step 220, state calculator 82 identifies, with reference to the data structure (e.g., directed graph 81) and an indication (e.g., list 79) of an essential set of components 40 which were pre-defined to be essential to the virtual appliance 42, a set 88 of components 40 that must complete for booting to be considered finished. In embodiments in which a directed graph structure 81 is used, step 220 may be accomplished by performing sub-step 225. In sub-step 225, state calculator 82 traverses the directed graph structure 81 in reverse order from the components 40 of list 79 to yield the set 88 of components 40 that must complete for booting to be considered finished.

In step 230, state calculator 82 queries each required component 40 of the set 88 of components 40 that must complete for its respective completion status. Once a process 102 or clustered component 104 "completes," that means that it has completed loading and is considered to be functioning, meaning, minimally, that it is capable of responding to queries. Typically a completed component 40 is ready to begin normal operation, as defined by the developer of the component 40. Any dependent components 40 may begin loading upon completion of the parent component 40. This step also includes receiving responses to the queries. In some embodiments (sub-step 232), receipt of a response indicates that the component 40 has successfully loaded; components 40 that have not yet completed loading will simply not respond to the query. Thus, as long as the boot process has not yet finished, only a strict subset of the required components 40 will respond to the queries. In other embodiments (sub-step 234), some components 40 may be capable of responding to queries before they have fully loaded; in such cases, a component 40 that has not yet fully loaded may respond with some indication of its own progress (e.g., 50%). In these latter embodiments, components 40 that have not yet even begun to load (or those that have only just begun to load) may not respond to the queries at all, but those that have progressed beyond a certain point, will respond with a progress indication up to 100%.

In step 240, state calculator 82 calculates an estimated completion percentage 83 for booting the virtual appliance 42 with reference to the respective completion statuses of each required component 40 versus all required components 40. In embodiments in which sub-step 232 was performed earlier, state calculator 82 performs this calculation by performing sub-step 242. In sub-step 242, state calculator 82 divides the number of elements of the strict subset (indicating the number of components 40 that have responded to the query; this may be stored as the sum 92 of completions) by the total number 90 of required components 40 from the list 88. Thus, for example, if there are 100 components 40 in the directed graph 81, and 47 of those are required, and 33 of those 47 components 40 have responded to the query, the completion percentage 83 would be 33/47 or approximately 70.2%.

In embodiments in which sub-step 234 was performed earlier, state calculator 82 performs this calculation by performing sub-steps 244-246. In sub-step 244, state calculator 82 sums the received percent completions for each component of the subset (indicating the number of components 40 that have responded with 100% completion plus a fraction for each component 40 that has responded with partial completion) to yield the sum 92 of completions. In sub-step 246, state calculator 82 divides the sum 92 of completions by the total number 90 of required components 40 from the list 88. Thus, for example, if there are 100 components 40 in the directed graph 81, and 47 of those are required, and 31 of those 47 components 40 have responded to the query with 100% completion, 4 with 50% completion, and 4 with 75% completion, the sum 92 of completions would be 31+(4×50%)+(3×75%)=35.25, so the completion percentage 83 would be 35.25/47 or 75%.

In some embodiments, instead of dividing the sum 92 of completions by the total number 90 of required components 40 from the list 88, state calculator 82 performs sub-step 248. In these embodiments, state calculator 82 models a remainder of the boot process by traversing the directed graph 81 from nodes 140 representing components 40 that have already completed towards nodes representing the essential set 79 of components 40 in parallel on a pre-determined maximum number of cores assigned to the virtual appliance 42. For example, with reference to the example directed graph 100 of FIG. 3, once clustered component 2 104(2) has completed, if VM 38(*a*) is assigned one processing core and VM 38(*b*) is assigned another processing core, clustered components 104(5), 104(7), and process 102(4) may be assumed to perform sequentially in parallel with the remaining components 104(3), 104(4), 104(6). However, because VM 38(*a*) only has one processing core, it has to process clustered components 104(3), 104(4) sequentially. Thus, state calculator 82 may model performance by noting that four components 102(1), 102(2), 104(1), 104(2) have already completed, while three components 40 remain to be completed on each core (104(3), 104(4), 104(6) on the core of 38(*a*) and 104(5), 104(7), 102(4) on the core of 38(b)), yielding a completion percentage 83 of 4/7 or approximately 57.1%.

In step 250, UI communication subsystem 86 causes a progress indication 62 of the completion percentage 83 to be displayed to the user 64 via the GUI 60. In embodiments in which the computing device 52 is the user device 56, step 250 includes displaying the progress indication 62 on the display 58 of the computing device 52 itself. In other embodiments, step 250 includes sending the progress indication 62 across network 34 to the user device 56 for the user device 56 to then display.

In some embodiments, step 250 is performed by UI communication subsystem 86 performing sub-step 251. In sub-step 251, UI communication subsystem 86 causes the completion percentage 83 itself to be displayed (e.g., a percentage such as 75% is displayed either as a number or in a graphical manner).

In other embodiments, step 250 is performed by boot time estimator module 84 performing sub-step 252 and then UI communication subsystem 86 performing sub-step 255. In step 252, boot time estimator module 84 multiplies the completion percentage 83 by an estimate of the total boot time (not depicted) to yield an estimate of the time remaining to boot (not depicted). In some embodiments (sub-sub-step 253), the estimate of the total boot time is a pre-established estimate based on timed boot results for similarly-configured systems. In other embodiments (sub-sub-step 254), the estimate of the total boot time is calculated with reference to previously-measured boot times for the virtual appliance 42. In these embodiments, each boot of the virtual appliance 42 is timed for future reference. In some embodiments, the first time the virtual appliance 42 boots up after being initially configured, sub-step 252 is performed using the estimate from sub-sub-step 253, but upon subsequent boots of the virtual appliance, sub-step 252 is performed using the estimate from sub-sub-step 254. Because an initial boot is typically significantly longer than a later reboot, sub-sub-step 254 will be more accurate starting from the second reboot of the virtual appliance 42.

Finally, in sub-step 255, UI communication subsystem 86 causes the calculated estimate of the time remaining to boot to be displayed (e.g., a time such as 15 minutes is displayed either as a number or in a graphical manner).

After completing step 250, if the booting process is not yet 100% complete, operation may again proceed with step 230, looping until the boot process terminates.

Thus, techniques for keeping a user 64 apprised of actual boot progress in an accurate manner have been described. This may be accomplished by defining a list 79 of essential components 40 of a virtual appliance 42 necessary for a complete boot and determining, at boot time, what other components 40 are also needed based on dependence relationships between the components 40. It is then possible to query all such needed components 40 and to estimate a percent completion 83. This percent completion 83 can be displayed to the user 64 as the boot progresses, or it may be combined with an expected boot time to estimate time remaining.

While various embodiments of the present disclosure have been particularly shown and described, it will be understood by those skilled in the art that various changes in form and details may be made therein without departing from the spirit and scope of the present disclosure as defined by the appended claims.

For example, it should be understood that although techniques have been described with reference to a VSA in a storage context, that was by way of example only. In fact, the virtual appliance 42 may be any kind of virtualized appliance.

In addition, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

It should be understood that all embodiments that have been described may be combined in all possible combinations with each other, except to the extent that such combinations have been explicitly excluded.

Finally, even if a technique, method, apparatus, or other concept is specifically labeled as "background" or "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method of displaying an estimate of progress in booting a virtual appliance on a set of virtual machines, the method comprising:
   building, by a computing device, a data structure that describes dependence relationships between components of the virtual appliance, the components comprising respective computational processes which may be invoked during booting, a dependence relationship indicating that a first component must complete before a second component may be invoked;
   identifying, by the computing device, with reference to the data structure and an indication of an essential set of components which were pre-defined to be essential to the virtual appliance, a set of components that must complete for booting to be considered finished; and
   after identifying the set of components required for booting, repeatedly, by the computing device:
      querying each required component of the set of components that must complete for its respective completion status;
      calculating an estimated completion percentage for booting the virtual appliance with reference to the respective completion statuses of each required component versus all required components; and
      displaying an indication of the completion percentage to a user via a user interface.

2. The method of claim 1 wherein:
   querying includes receiving query responses for a strict subset of the set of components, the query response for each component of the subset indicating completion of that respective component; and
   calculating the estimated completion percentage includes dividing a number of elements of the subset by a number of elements of the set of components that must complete.

3. The method of claim 1 wherein:
   querying includes receiving query responses for a subset of the set of components, the query response for each component of the subset indicating a percent completion of that respective component; and calculating the estimated completion percentage includes:
   summing the received percent completions for each component of the subset, yielding a completion sum; and
   dividing the completion sum by a number of elements of the set of components that must complete.

4. The method of claim 1 wherein:
   building the data structure includes creating a directed graph structure in which the components are represented by nodes and a dependence relationship indicating that a first component must complete before a second component may be invoked is represented by a directed edge from a node representing the first component towards a node representing the second component; and
   identifying the set of components that must complete for booting to be considered finished includes traversing the directed graph structure in reverse order from the essential set of components to yield the set of components that must complete for booting to be considered finished.

5. The method of claim 4 wherein calculating the estimated completion percentage includes modeling a remainder of the boot process by traversing the directed graph from nodes representing components that have already completed towards nodes representing the essential set of components in parallel on a pre-determined maximum number of cores assigned to the virtual appliance.

6. The method of claim 1 wherein displaying the indication of the completion percentage includes displaying the completion percentage to the user directly via the user interface.

7. The method of claim 1 wherein displaying the indication of the completion percentage includes:
   calculating an estimate of time remaining to boot the virtual appliance by multiplying the completion percentage by an estimate of the total boot time; and
   displaying the estimate of time remaining to boot to the user via the user interface.

8. The method of claim 7 wherein:
   the method is performed as part of a first boot of the virtual appliance upon being initially configured; and
   the estimate of the total boot time is pre-established based on timed boot results for similarly-configured systems.

9. The method of claim 7 wherein:
   the method is performed as part of a reboot of the virtual appliance, the virtual appliance having been previously booted on the set of virtual machines; and
   the method further comprises calculating the estimate of the total boot time with reference to previous measured boot times for the virtual appliance on the set of virtual machines.

10. The method of claim 1 wherein the virtual appliance comprises a single virtual machine running on a single server.

11. The method of claim 1 wherein:
    the virtual appliance comprises a plurality of virtual machines running on a plurality of servers; and
    the components further comprise respective clustered-managed resources invoked during booting by one of the plurality of virtual machines.

12. The method of claim 11 wherein the computing device is one of the plurality of servers.

13. The method of claim 11 wherein the virtual appliance is a virtual storage appliance, and the plurality of virtual machines are respective virtual storage processors each configured, in a fault-tolerant swappable manner, to respond to host storage queries by accessing physical storage devices available to that virtual storage processor over a network.

14. The method of claim 1 wherein the virtual appliance is a virtual storage appliance configured to respond to host storage queries by accessing physical storage devices available to the virtual appliance over a network.

15. The method of claim 1 wherein:
    the virtual machine runs on the computing device, the virtual machine being managed by a hypervisor running on the computing device;
    the method is performed by the hypervisor; and
    displaying the indication of the completion percentage to the user via the user interface includes the hypervisor sending the indication from the computing device to a user device over a network connection to be displayed on a display of the user device.

16. The method of claim 1 wherein the components which were pre-defined to be essential to the virtual appliance were pre-defined by a programmer upon programming code of the virtual appliance.

17. The method of claim 1 wherein the components which were pre-defined to be essential to the virtual appliance were indicated by the user upon initially configuring the virtual appliance.

18. A computer program product comprising a non-transitory computer-readable storage medium storing a set of instructions, which, when performed by a computing device, causes the computing device to display an estimate of progress in booting a virtual appliance on a set of virtual machines by:
    building, by the computing device, a data structure that describes dependence relationships between components of the virtual appliance, the components comprising respective computational processes which may be invoked during booting, a dependence relationship indicating that a first component must complete before a second component may be invoked;
    identifying, by the computing device, with reference to the data structure and an indication of an essential set of components which were pre-defined to be essential to the virtual appliance, a set of components that must complete for booting to be considered finished; and
    after identifying the set of components required for booting, repeatedly, by the computing device:
       querying each required component of the set of components that must complete for its respective completion status;
       calculating an estimated completion percentage for booting the virtual appliance with reference to the respective completion statuses of each required component versus all required components; and
       displaying an indication of the completion percentage to a user via a user interface.

19. A system comprising:
    a user device;
    a network to which the user device is communicatively connected; and
    a set of servers which run a virtual appliance on a set of virtual machines, the set of servers being communicatively connected to the network, the set of servers including a computing device configured to estimate progress in booting the virtual appliance by:
       building, by the computing device, a data structure that describes dependence relationships between components of the virtual appliance, the components comprising respective computational processes which may be invoked during booting, a dependence relationship indicating that a first component must complete before a second component may be invoked;
identifying, by the computing device, with reference to the data structure and an indication of an essential set of components which were pre-defined to be essential to the virtual appliance, a set of components that must complete for booting to be considered finished; and
after identifying the set of components required for booting, repeatedly, by the computing device:
  querying each required component of the set of components that must complete for its respective completion status;
  calculating an estimated completion percentage for booting the virtual appliance with reference to the respective completion statuses of each required component versus all required components; and
  sending an indication of the completion percentage to the user device over the network to be displayed to a user via a user interface of the user device.

* * * * *